(12) United States Patent
Lee et al.

(10) Patent No.: US 6,519,563 B1
(45) Date of Patent: Feb. 11, 2003

(54) BACKGROUND MODEL DESIGN FOR FLEXIBLE AND PORTABLE SPEAKER VERIFICATION SYSTEMS

(75) Inventors: Chin-Hui Lee, Basking Ridge, NJ (US); Qi P. Li, New Providence, NJ (US); Olivier Siohan, New Providence, NJ (US); Arun Chandrasekaran Surendran, Highland Park, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/444,106

(22) Filed: Nov. 22, 1999

Related U.S. Application Data

(60) Provisional application No. 60/120,102, filed on Feb. 16, 1999.

(51) Int. Cl.[7] ............................................. G10L 15/14
(52) U.S. Cl. ...................... 704/246; 704/250; 704/256
(58) Field of Search ............................. 704/246, 256, 704/250, 251, 232, 243, 239, 240

(56) References Cited

U.S. PATENT DOCUMENTS

| | | | | |
|---|---|---|---|---|
| 5,960,392 A | * | 9/1999 | Sundberg et al. | 704/236 |
| 5,995,927 A | * | 11/1999 | Li | 704/246 |
| 6,029,124 A | * | 2/2000 | Gillick et al. | 704/200 |
| 6,182,037 B1 | * | 1/2001 | Maes | 704/247 |
| 6,253,179 B1 | * | 6/2001 | Beigi et al. | 704/243 |
| 6,272,463 B1 | * | 8/2001 | Lapere | 704/248 |

OTHER PUBLICATIONS

"General Phrase Speaker Verification Using Sub–Word Background Models Models And Likelihood–Ratio Scoring", by S. Parthasarathy and A. E. Rosenberg, In Proc. Int. Conf. on Spoken Language Processing, Philadelphia, USA, 1996. ICSLP '96.

"Speaker Verification Using Randomized Phrase Prompting", by A. Higgins, L. Bahler, and J. Porter, Digital Signal Processing, 1991, pp. 1:89–106.

"The Use of Cohort Normalized Scores For Speaker Verification" by A.E. Rosenberg; J. DeLong; C.–H. Lee; B–H. Juang; F. K. Soong, Int. Conf. on Spoken Language Processing, 1992, Banff, Alberta, Canada. ICSLP pp. 599–602.

"A Segmental K–Means Training Procedure For Connected Word Recognition", By L. R. Rabiner, J.G. Wilpon, and B–H. Juang, AT&T Bell Labs Technical Journal, 65(3):21–31, 1986.

"Maximum Likelihood From Incomplete Data via the EM Algorithm" by A.P. Dempster, N.M. Laird and D. B. Rubin and "Discussion on the Paper" by Professor Dempster, Professor Laird and Dr. Rubin, Journal of Royal Statistical Society Series B, vol. 39, 1977, pp. 1–38.

"Speaker Identification and Verification Using Gaussian Mixture Speaker Models", by D. Reynolds. Speech Communication, vol. 17: 1–2, 1995 pp. 91–108.

* cited by examiner

*Primary Examiner*—Marsha D. Banks-Harold
*Assistant Examiner*—Daniel Abebe
(74) *Attorney, Agent, or Firm*—Kenneth M. Brown

(57) ABSTRACT

A speaker verification method and apparatus which advantageously minimizes the constraints on the customer and simplifies the system architecture by using a speaker dependent, rather than a speaker independent, background model, thereby obtaining many of the advantages of using a background model in a speaker verification process without many of the disadvantages thereof. In particular, no training data (e.g. speech) from anyone other than the customer is required, no speaker independent models need to be produced, no a priori knowledge of acoustic rules are required, and, no multi-lingual phone models, dictionaries, or letter-to-sound rules are needed. Nonetheless, in accordance with an illustrative embodiment of the present invention, the customer is free to select any password phrase in any language. Specifically, and in accordance with an illustrative embodiment of the present invention, the background model comprises a hidden Markov model having a cruder acoustic resolution than the customer model, which may, for example, be achieved by providing a background model containing fewer states than the customer model.

24 Claims, 1 Drawing Sheet

BACKGROUND MODEL DESIGN FOR FLEXIBLE AND PORTABLE SPEAKER VERIFICATION SYSTEMS

CROSS-REFERENCE TO RELATED APPLICATION

The present application hereby claims the benefit of previously filed Provisional patent application Ser. No. 60/120102, "Background Model Design for Flexible and Portable Speaker Verification Systems," filed by C-H. Lee et al. on Feb. 16, 1999.

FILED OF THE INVENTION

The present invention relates generally to the field of speaker verification systems and more particularly to a method for creating background models for use therewith.

BACKGROUND OF THE INVENTION

Speaker verification is the process of verifying the identity of a speaker based upon an analysis of a sample of his or her speech using previously saved information. More particularly, speaker verification consists of making a determination as to whether the identity of a speaker is, in fact, the same as an identity being claimed therefor (usually by the speaker himself or herself). Some applications of speaker verification include, for example, access control for a variety of purposes, such as for telephones, computer networks, databases, bank accounts, credit-card funds, automatic teller machines, building or office entry, etc. Automatic verification of a person's identity based upon his or her voice is quite convenient for users, and, moreover, it typically can be implemented in a less costly manner than many other biometric methods such as, for example, fingerprint analysis. Moreover, speaker verification is fully non-intrusive, unlike such other biometric methods. For these reasons, speaker verification has recently become of particular importance in mobile and wireless applications.

Typically, speaker verification is performed based upon previously saved information which, at least in part, represents particular vocal characteristics of the speaker whose identity is to be verified. Specifically, the speech signal which results from a speaker's "test" utterance (i.e., an utterance offered for the purpose of verifying the speaker's identity) is analyzed to extract certain acoustic "features" of the speech signal. Then, these features are compared with corresponding features which have been extracted from previously uttered speech spoken by the same individual.

The previously uttered speech which is used for comparison purposes most commonly, but not necessarily, consists of a number of repetitions of the same word or phrase as the one which is to be spoken as the "test" utterance. In any case, the previously uttered speech is referred to as "training" speech, and it is provided to the system as part of an "enrollment" session. If the same word or phrase is used for both the training utterances and the test utterance, the process is referred to as "text dependent" or "fixed phrase" speaker verification. If, on the other hand, the speaker is permitted to use any speech as a test utterance, the process is referred to as "text independent" speaker verification, and operates based solely on the general vocal characteristics of the speaker. The latter approach clearly provides more flexibility, but it is not nearly as robust in terms of verification accuracy as a fixed phrase approach.

Specifically, the speaker's claimed identity is verified (or not), based on the results of a comparison between the features of the speaker's test utterance and those of the training speech. In particular, the previously uttered speech samples are used to produce speech "models" which may, for example, comprise stochastic models such as hidden Markov models (HMMs), well known to those of ordinary skill in the art. (Note that in the case of text independent speaker verification, these models are typically atemporal models, such as, for example, one state HMMs, thereby capturing the general vocal characteristics of the speaker but not the particular selection and ordering of the uttered phonemes.)

The model which is used for comparison with the features extracted from the speech utterance is known as a "speaker dependent" model, since it is generated from training speech of a particular, single speaker. Models which are derived from training speech of a plurality of different speakers are known as "speaker independent" models, and are commonly used, for example, in speech recognition tasks. In its simplest form, speaker verification may be performed by merely comparing the test utterance features against those of the speaker dependent model, determining a "score" representing the quality of the match therebetween, and then making the decision to verify (or not) the claimed identity of the speaker based on a comparison of the score to a predetermined threshold. One common difficulty with this approach is that it is particularly difficult to set the threshold in a manner which results in a reasonably high quality of verification accuracy (i.e., the infrequency with which misverification—either false positive or false negative results—occurs). In particular, the predetermined threshold must be set in a speaker dependent manner—the same threshold that works well for one speaker is not likely to work well for another.

Addressing this problem, it has long since been determined that a substantial increase in verification accuracy can be obtained if a speaker independent "background model" is also compared to and scored against the test utterance, and if the ratio of the scores (i.e., the score from the comparison with the speaker dependent model divided by the score from the comparison with the background model) is compared to a predetermined threshold instead. Moreover, in this case, it is usually possible to choose a single predetermined value for the threshold, used for all speakers to be verified (hereinafter referred to as "customers"), and to obtain a high quality level of verification accuracy therewith. Both of these advantages of using a background model for comparison purposes result from the effect of doing so on probability distributions of the resultant scores. In particular, using such a background model increases the separation between the probability distribution of the actual customer scores (i. e., the scores achieved when the person who actually trained the speaker dependent model provides the test utterance) and the probability distribution of imposter scores (i.e., the scores achieved when some other person provides the test utterance). Thus, it is easier to set an appropriate threshold value, and the accuracy of the verification results improve.

Some studies of speaker verification systems using speaker independent background models advocate that the background model should be derived from speakers which have been randomly selected from a speaker independent database. (See, e.g., D. Reynolds, "Speaker Identification and Verification Using Gaussian Mixture Speaker Models," Speech Communication, vol. 17: 1–2, 1995.) Other studies suggest that speakers which are acoustically "close" to the person having the claimed identity (i.e., "cohort" speakers) should be selected for use in generating the background model, since these speakers are representative of the population near the claimed speaker. (See, e.g., A. E. Rosenberg et al., "The Use of Cohort Normalized Scores for Speaker Verification," Proc. Int. Conf. on Spoken Language Processing, Banff, Alberta, Canada, 1992.) By using such a selection of speakers, this latter approach claims to improve the selectivity of the system as against voices which are similar to that of the customer, thereby reducing the false acceptance rate of the system.

Specifically, most state-of-the-art fixed phrase (i.e., text dependent) speaker verification systems verify the identity of the speaker through what is known in the art as a Neyman-Pearson test, based on a normalized likelihood score of a spoken password phrase. (See, e.g., A. L. Higgins et al., "Speaker Verification Using Randomized Phrase Prompting," Digital Signal Processing, 1:89–106, 1991.) If $\lambda_c$ is the customer model (i.e., the speaker dependent model generated from the enrollment session performed by the particular customer), then given some set of acoustic observations X (i. e., features derived from the test utterance), then the normalized score $s_{norm}(X, \lambda_c)$ is typically computed as being the ratio of the "likelihoods" as follows:

$$s_{norm}(X, \lambda_c) = \frac{p(X|\lambda_c)}{p(X|\lambda_B)},$$

where $p(X|\lambda)$ is the likelihood of the observations X given the model $\lambda$, and where $\lambda_B$ in particular is a background model. As described above, the customer model is usually a hidden Markov model (HMM) built from repeated utterances of a password phrase spoken by the customer during an enrollment session. This model is usually created either by concatenating phone-based HMMs (familiar to those skilled in the art) for the particular customer, or by directly estimating a whole-phrase HMM. (See, e g., S. Parthasarathy et al., "General Phrase Speaker Verification Using Sub-Word Background Models and Likelihood-Ratio Scoring," Proc. Int. Conf. on Spoken Language Processing, Philadelphia, 1996.) As also pointed out above, the background model of the prior art is a speaker independent model (e.g., an HMM), that reduces or eliminates the need for determining speaker dependent thresholds. The background model is typically built by concatenating speaker independent phone models of the particular customer's password phrase.

In applications where it is desirable to give the customer the freedom to select his or her own password phrase in his or her own language, most prior art systems assume that the phonetic transcription of the customer password phrase is available, which in turn assumes the availability of pre-trained multi-lingual phone models, dictionaries and a set of letter-to-sound rules for the particular language. Because good phone end-points are necessary, a speaker independent phone recognizer might be used, for example, to derive the phone segmentation. The overall architecture of such a speaker verification system can therefore become quite complicated.

Furthermore, having a good set of speaker independent background phone models often necessitates that each model have a large acoustic resolution—that is, a high number of mixture components per state—in order to obtain high quality performance characteristics. (See, e.g., Parthasarathy et al., cited above.) This, in turn, demands a higher level of computation and memory requirements, which may not be desirable for applications running on hand-held devices such as personal digital assistants, palm-top computers or wireless phones. Moreover, there is also an issue of robustness—the background speaker independent phone models provided by the system may exhibit very different acoustic properties from the particular operating condition under which the test phrase is being uttered. As a result, misverification may occur under operating conditions which differ from those which existed at the time the background model data was gathered. For practical purposes, and most particularly in portable applications, these requirements and limitations may not be desirable, and they may create a unreasonable burden on both the customer and the system developer alike. The customer may wish to select a password phrase in any language, and he or she may choose to perform speaker verification with any type of microphone under any set of acoustic conditions.

SUMMARY OF THE INVENTION

In accordance with the principles of the present invention, a novel speaker verification method and apparatus is provided which advantageously minimizes the constraints on the customer and substantially simplifies the system architecture. Specifically, we have realized that it is possible to create and make use of a speaker dependent, rather than a speaker independent, background model, and by doing so, that many of the advantages of using a background model in a speaker verification process may be obtained without many of the disadvantages thereof. In particular, with the use of such an approach, no training data (i.e., speech) from anyone other than the customer is required, no speaker independent models need to be produced, no a priori knowledge of acoustic rules are required, and, no multi-lingual phone models, dictionaries, or letter-to-sound rules are needed. Nonetheless, in accordance with a first illustrative embodiment of the present invention, the customer is free to select any password phrase in any language. Specifically, the speaker verification system in accordance with the present invention may be advantageously built with no speech material or other prior information whatsoever, other than the set of enrollment utterances provided by the customer himself or herself as part of the enrollment session. The net result is a flexible and simple speaker verification system, which nonetheless achieves a performance quality which is appreciably better than would a system which uses no background model at all.

More specifically, the present invention provides a method and apparatus for verifying a proffered identity of a speaker (e.g., for performing speaker verification) comprising steps or means for (a) comparing features of a speech utterance spoken by the speaker with a first speaker dependent speech model (e.g., a HMM), the first speaker dependent speech model based upon previously provided training speech from a person having said proffered identity, and determining a first score based upon such a comparison; (b) comparing features of the speech utterance spoken by the speaker with a second speaker dependent speech model (e.g., another HMM), the second speaker dependent speech model also based upon the same previously provided training speech from the person having said proffered identity, and determining a second score based upon such a comparison; and (c) verifying the proffered identity of the speaker based upon a value reflecting a differential between the first score and the second score (such as, for example, a ratio of the first score to the second score).

Obviously, it would be pointless if the background model were exactly the same as the customer model, since the scores (i.e., the likelihoods) would always be the same and so the ratio would always be unity. Therefore, in accordance with the principles of the present invention, a background model which differs from the customer model is generated, despite having been generated based on the same training speech (i.e., the same enrollment data) as the customer model.

For example, in accordance with the first illustrative embodiment of the present invention, the background model, like the customer model, is generated from the customer's repeated enrollment utterances of a fixed password phrase, but the background model is created so as to be representative of a more general model than is the customer model—specifically, not so general so as to provide no added information when used as a background model, but general enough to be somewhat different than the customer model itself. One illustrative way of achieving this result (in accordance with the first illustrative embodiment) is to produce a background model which, although it is generated from the same enrollment utterances as is the customer model, nonetheless has a cruder acoustic resolution than does the customer model. Such a cruder acoustic resolution may be achieved, for example, by producing an HMM having fewer states than the customer model. Alternatively, cruder acoustic resolution may be achieved by producing an HMM having fewer acoustic parameters than the customer model.

In addition, and in accordance with other illustrative embodiments of the present invention, a background model for fixed phrase speaker verification may be generated by perturbing the temporal information thereof. For example, a customer model comprising a multi-state HMM may be modified to produce the background model by, for example, reversing the ordering of the HMM states. Alternatively, a background model comprising a multi-state HMM having fewer states than the customer model may be generated (as described above, for example), and then the. ordering of the HMM states may be reversed.

And in accordance with still other illustrative embodiments of the present invention, a background model for a text independent speaker verification system may also be generated from the same customer enrollment data as is the customer model, but with fewer acoustic parameters. In this manner, although both the customer model and the background model each may comprise single state HMMs (as is typical with text independent speaker verification systems), the background model once again can be constructed so as to have a cruder acoustic resolution than does the customer model.

DETAILED DESCRIPTION

A Prior Art Phrase Based Speaker Verification System

Figure 1:
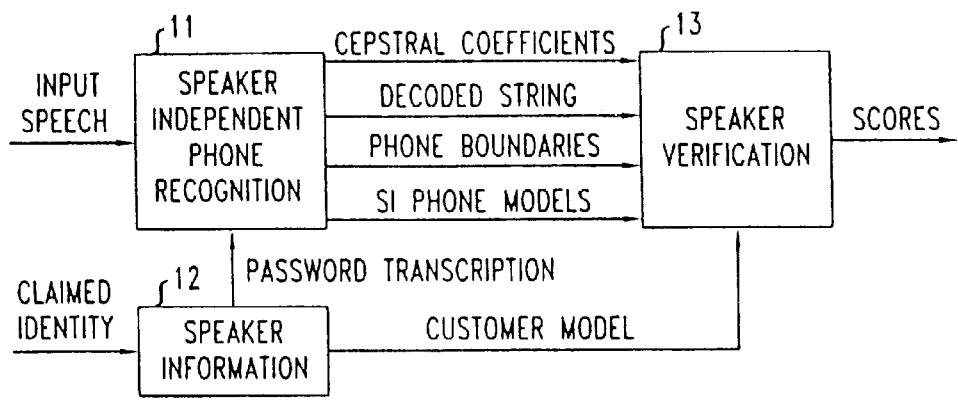
FIG. 1 shows a block diagram illustrating the architecture of a prior art phrase based speaker verification system which uses a conventional speaker independent background model.

FIG. 1 shows a block diagram illustrating the architecture of a traditional prior art phrase based speaker verification system which uses a conventional speaker independent background model. The system includes speaker independent phone recognition module 11, speaker information module 12, and speaker verification module 13. In operation, a claimed identity of the speaker is provided (typically by the speaker himself or herself) to speaker information module 12. Then, based upon the claimed identity, speaker information module 12 determines the password phrase which is associated with that particular customer (i.e., the person having the claimed identity). (As used herein, the terms password phrase, password, and pass phrase are to be hereinafter considered synonymous, each of which is hereby defined to include any "phrase" comprising one or more "words," where each such "word" comprises any sequence of one or more pronounceable syllables, regardless of whether or not such sequences of syllables have any ascertainable meaning in any language. That is, a password phrase may, in general, be any pronounceable sequence of sounds.)

Once speaker information module 12 has determined the appropriate password phrase, it passes a phonetic transcription of that password phrase to speaker independent phone recognition module 11 and passes the previously generated customer model (e.g., a HMM) associated with the person having the claimed identity to speaker verification module 13. Speaker independent phone recognition module 11 receives the input speech utterance from the speaker and derives cepstral (frequency) coefficients, a decoded string, phone boundaries, and speaker independent phone models, all based on the input speech received from the speaker and on the transcription of the determined password phrase received from speaker information module 12. Finally, based upon these inputs, speaker verification module 13 produces a speaker independent background model, and scores the input speech utterance (actually the cepstral coefficients therefrom) against both the background model and the actual customer model (e.g., the HMM) for the person having the claimed identity. The determination as to whether to accept or reject the speaker as having the claimed identity is then based on comparing the ratio of likelihoods (i.e., the likelihood of the observations given the customer model divided by the likelihood of the observations given the background model) to a given threshold, as described in the Background section above.

Overview of the Principles of the Present Invention

Figure 2:
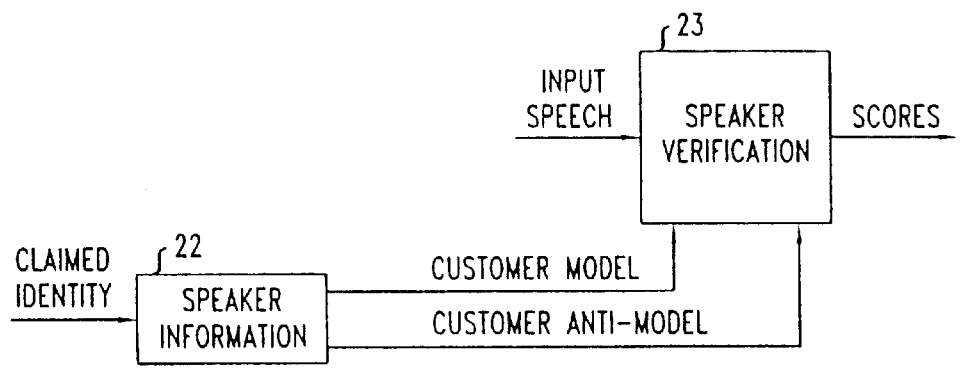
FIG. 2 shows a block diagram illustrating the architecture of a speaker verification system in accordance with an illustrative embodiment of the present invention.

In accordance with the principles of the present invention, a speaker dependent background model which has been derived from the same training speech as the customer model is used for speaker verification for purposes of normalization. In particular, FIG. 2 shows a block diagram illustrating the architecture of such a speaker verification system in accordance with an illustrative embodiment of the present invention. The system includes speaker verification module 23 and speaker information module 22.

In operation, a claimed identity of the speaker is provided (typically by the speaker himself or herself) to speaker information module 22. Then, based upon this claimed identity, speaker information module 22 provides to speaker verification module 21 both the previously generated customer model (e.g., a HMM) associated with the person having the claimed identity, and a corresponding previously generated customer anti-model (e.g., another HMM) for use as a background model. Speaker verification module 23 then scores the input speech utterance (actually the cepstral coefficients therefrom) against both the customer model and the background model (i.e., the customer anti-model) provided by speaker information module 22. The determination as to whether to accept or reject the speaker as having the claimed identity is then based on comparing the ratio of likelihoods (i.e., the likelihood of the observations given the customer model divided by the likelihood of the observations given the background model) to a given threshold, as in the prior art system shown in FIG. 1 and as described in the Background section above.

A First Illustrative Embodiment of the Present Invention

In accordance with a first illustrative embodiment of the present invention, the customer is able to choose his or her own password phrase and will be asked to repeat this utterance several times for enrollment. Advantageously, no other speech data or model needs to be available in order to perform speaker verification for the given customer, and neither does orthographic or phonetic transcriptions of the password phrase utterance.

Specifically, the acoustic information in the customer password phrase is illustratively modeled using a whole phrase HMM, $\lambda_c$ (the customer model), which may be derived from the set of enrollment utterances in a fully conventional manner. The background model (i. e., the customer anti-model), $\lambda_B$, is also a whole phrase HMM derived from the same set of enrollment utterances in a conventional manner, but, in accordance with the first illustrative embodiment of the present invention, the background model advantageously has a small number of parameters as compared to the customer model $\lambda_c$, and therefore has a cruder acoustic resolution. That is, whereas the customer model $\lambda_c$ is designed to provide a relatively fine acoustic resolution of the password phrase, the background model $\lambda_B$ advantageously provides only a rough acoustic resolution. This can be achieved, for example, by using a smaller number of states for the background model $\lambda_B$ as compared to the number of states used in the customer model $\lambda_c$. Thus, background model $\lambda_B$ operates as a customer anti-model, and, as a result of the principles of the present invention, each customer advantageously has his or her own individual customer model and customer anti-model.

Thus, in accordance with the first illustrative embodiment of the present invention, the customer model $\lambda_c$ consists of a relatively large number of states, such as, for example, 25, while the background model consists of a relatively small number of states, such as, for example, 5 or less. In fact, the background model can even be a single state HMM having no intrinsic temporal information at all.

Figure 3A:
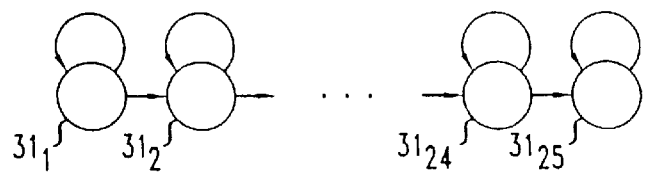
FIGS. 3A and 3B show a customer model and a corresponding customer anti-model, respectively, which may be employed in the illustrative architecture shown in FIG. 2 in accordance with a first illustrative embodiment of the present invention.
Figure 3B:
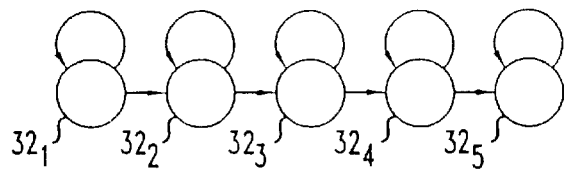

By way of example, FIGS. 3A and 3B show an illustrative customer model and a corresponding illustrative customer anti-model, respectively, which may be employed in the illustrative architecture shown in FIG. 2 and in accordance with the first illustrative embodiment of the present invention. As can be seen from the figures, the illustrative customer model $\lambda_c$ consists of 25 states—namely, state $31_1$ through state $31_{25}$—while the illustrative customer anti-model $\lambda_B$ consists of only 5 states—namely, state $32_1$ through state $32_5$. In this manner, the illustrative customer anti-model of FIG. 3B will advantageously possess a much cruder acoustic resolution than will the illustrative customer model of FIG. 3A.

With an approach such as that described above, the customer can advantageously choose any password phrase in any language, no speaker independent data needs to be used, and nonetheless, useful acoustic normalization is advantageously provided by the background model. Moreover, since, in accordance with the principles of the present invention, both models $\lambda_c$ and $\lambda_B$ are trained from the same data, there can be no acoustic mismatch related to the environment between these two models. This contrasts with prior art systems using pre-trained speaker independent background models, which may be rather sensitive to changes in the environment. Such systems often need to impose additional constraints on the user, such as, for example, the use of a particular microphone.

In accordance with the first illustrative embodiment of the present invention, front end processing may be advantageously performed on the input speech utterance by first passing the signal through a 3200 Hz low-pass anti-aliasing filter, familiar to those of ordinary skill in the art. If the input speech utterance is being provided by telephone (a common application of speech verification), a 300 Hz high-pass filter, also familiar to those skilled in the art, may then be advantageously applied to minimize the effect of processing in the telephone network. The resulting signal may then be advantageously pre-emphasized using a first order difference, and 10th order linear predictive coding (LPC) coefficients may be advantageously derived every 10 ms over 30 ms Hamming windowed segments. Finally, the 10 LPC coefficients may be advantageously converted to 12th order cepstral coefficients (LPCC) and a feature vector of 24 components, consisting of 12 LPCC and their first derivatives may be advantageously produced at each frame. (Each of the above mechanisms and operations is fully familiar to those of ordinary skill in the speech processing art.)

More specifically, in accordance with the first illustrative embodiment of the present invention, three models, $\lambda_c$, $\lambda_B$ and $\lambda_{sil}$ are built for each customer. The detailed customer model $\lambda_c$ is illustratively a left-to-right HMM, consisting of 25 states with up to 4 Gaussian mixture components per state. The relatively more acoustically crude background model $\lambda_B$ is illustratively a 5-state, left-to-right HMM with 4 Gaussian mixture components per state. In addition, a silence model $\lambda_{sil}$, illustratively consisting of 3 states and 4 Gaussian mixture components, is also advantageously trained for each customer. (The use of silence models in speech verification is familiar to those of ordinary skill in the art.) All Gaussian probability density functions advantageously have a diagonal covariance matrix. All models may be advantageously trained using a segmental K-means training procedure, followed by a number of iterations of the Expectation Maximization (EM) algorithm, such as, for example, one such iteration for each of the available training utterances. (Both the segmental K-means training procedure and the EM algorithm are fully familiar to those of ordinary skill in the art. See, e.g., L. R. Rabiner et al., "A segmental K-means Training Procedure for Connected Word Recognition," AT&T Bell Labs Tech. J., 65(3), 1986, and A. P. Dempster et al, "Maximum Likelihood from Incomplete Data via the EM Algorithm," Journal of Royal Statistical Society Series B, vol. 39, 1977, respectively.) In addition, the covariance matrices of the detailed model $\lambda_c$ may be advantageously tied in order to achieve a more robust estimation.

Also in accordance with the first illustrative embodiment of the present invention, a conventional Viterbi decoding is performed for each test utterance using the detailed model $\lambda_c$ and the silence model $\lambda_{sil}$ to find an optimal state segmentation and to get a speech versus silence segmentation. (Viterbi decoding is also fully familiar to those of ordinary skill in the art.) The speech segment is also advantageously decoded using the background model $\lambda_B$. Average log-likelihood scores, log $p(X|\lambda_c)$ and log $p(X'\lambda_B)$, may then be obtained over the speech segment for the two models $\lambda_c$ and $\lambda_B$.

And finally, a normalized score representing the ratio of the two likelihoods may then be computed for comparison to a predetermined threshold, and the result of such a comparison may then be used to determine acceptance or rejection of the claimed identity. More specifically, the mathematical difference of the log-likelihood scores may be computed. Such a difference is more easily computed than is the ratio of the likelihoods, but nonetheless provides a totally mathematical equivalent thereto.

In accordance with the first illustrative embodiment of the present invention, the predetermined threshold may be determined in any of a number of conventional ways, each of which is familiar to those of ordinary skill in the art. For example, the threshold may be determined on either a speaker dependent basis (i.e., a different threshold for each speaker) or a speaker independent basis (i.e., the same threshold for all speakers). In addition, the threshold or thresholds may be determined experimentally, as is commonly done in prior art speaker verification systems using speaker independent background models. Finally, in one illustrative embodiment of the present invention, the threshold is simply set to unity (i.e., one).

Other Illustrative Embodiments of the Present Invention

In accordance with certain other illustrative embodiments of the present invention, the background model may be initially trained as previously described, but the state order may be advantageously reversed after training. For example, if the background model were trained as a 5 state HMM, states 1 and 5 could be temporally swapped and states 2 and 4 could also be temporally swapped, thus resulting in a temporally reversed HMM. (Alternatively, the background model may be identical to the customer model but for such a temporal perturbation, such as the one described herein.) By perturbing the temporal information in this manner, but still retaining the spectral information related to the enrollment data and thereby to the customer model, a background model with more "smear" is advantageously obtained. Such a model can still provide some acoustic normalization when computing the likelihood ratio.

In accordance with still other illustrative embodiments, the background model may be generated based on other types of "perturbations" as well. For example, the background model generation process may perturb either the customer model itself, a background model as otherwise generated (i.e., generated, for example, in accordance with any of the techniques described herein), or the original enrollment data itself in any of a number of ways, many of which will be obvious to those of ordinary skill in the art. That is, such a perturbation may be performed either before, during, or after training, and it may comprise any modification of data or models which will tend to result in a background model which is, in some manner, acoustically less accurate than the customer model. By way of example, noise may be added to the enrollment utterances before generating the background model, or, alternatively, the variance of the background model may be perturbed after training. Numerous other such perturbations of enrollment data or of speech models will be obvious to those of ordinary skill in the art.

Addendum to the Detailed Description

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the Figs. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, (a) a combination of circuit elements which performs that function or (b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent (within the meaning of that term as used in 35 U.S.C. 112, paragraph 6) to those explicitly shown and described herein.

What is claimed is:

1. A method of verifying a proffered identity of a speaker, the method comprising the steps of:

comparing features of a speech utterance spoken by the speaker with a first speaker dependent speech model, the first speaker dependent speech model based upon previously provided training speech from a person having said proffered identity, and determining a first score based upon said comparison;

comparing features of the speech utterance spoken by the speaker with a second speaker dependent speech model, the second speaker dependent speech model also based upon said previously provided training speech from the person having said proffered identity, and determining a second score based upon said comparison; and verifying said proffered identity of the speaker based upon a value reflecting a differential between said first score and said second score, wherein said first speaker dependent speech model comprises a first hidden Markov model comprising a first ordering of a set of states, and said second speaker dependent speech model comprises a second hidden Markov model comprising a second ordering of said set of states, said second ordering of said set of states having been derived by performing a reordering of said first ordering of said set of states.

2. The method of claim 1 wherein said value reflecting the differential between said first score and said second score comprises a mathematical ratio of said first score to said second score.

3. The method of claim 1 wherein said value reflecting the differential between said first score and said second score comprises a mathematical difference comprising a logarithm of said second score subtracted from a logarithm of said first score.

4. The method of claim 1 wherein said first speaker dependent speech model and said second speaker dependent speech model each comprises a hidden Markov model.

5. The method of claim 1 wherein said first speaker dependent speech model comprises a first hidden Markov model, and said second speaker dependent speech model comprises a second hidden Markov model, and wherein said second hidden Markov model contains fewer states than said first hidden Markov model.

6. The method of claim 1 wherein said second ordering of said set of states comprises a reversal of said first ordering of said set of states.

7. The method of claim 1 wherein said first speaker dependent speech model comprises a first hidden Markov model, and said second speaker dependent speech model comprises a second hidden Markov model, and wherein said second hidden Markov model contains fewer acoustic parameters than said first hidden Markov model.

8. The method of claim 7 wherein each of said first speaker dependent speech model and said second speaker dependent speech model comprises a single state hidden Markov model.

9. The method of claim 1 wherein said previously provided training speech comprises a plurality of repetitions of a phrase comprising one or more words, and wherein said speech utterance spoken by the speaker also comprises said phrase comprising said one or more words.

10. The method of claim 1 wherein said speech utterance spoken by the speaker comprises a phrase comprising one or more words, and wherein said previously provided training speech does not include said phrase comprising said one or more words.

11. The method of claim 1 wherein said step of verifying said proffered identity of the speaker comprises comparing said value reflecting a differential between said first score and said second score to a predetermined threshold.

12. The method of claim 11 wherein the predetermined threshold equals one.

13. An apparatus for verifying a proffered identity of a speaker, the apparatus comprising:

means for comparing features of a speech utterance spoken by the speaker with a first speaker dependent speech model, the first speaker dependent speech model based upon previously provided training speech from a person having said proffered identity, and means for determining a first score based upon said comparison;

means for comparing features of the speech utterance spoken by the speaker with a second speaker dependent speech model, the second speaker dependent speech model also based upon said previously provided training speech from the person having said proffered identity, and means for determining a second score based upon said comparison; and means for verifying said proffered identity of the speaker based upon a value reflecting a differential between said first score and said second score, wherein said first speaker dependent speech model comprises a first hidden Markov model comprising a first ordering of a set of states, and said second speaker dependent speech model comprises a second hidden Markov model comprising a second ordering of said set of states, said second ordering of said set of states having been derived by performing a reordering of said first ordering of said set of states.

14. The apparatus of claim 13 wherein said value reflecting the differential between said first score and said second score comprises a mathematical ratio of said first score to said second score.

15. The apparatus of claim 13 wherein said value reflecting the differential between said first score and said second score comprises a mathematical difference comprising a logarithm of said second score subtracted from a logarithm of said first score.

16. The apparatus of claim 13 wherein said first speaker dependent speech model and said second speaker dependent speech model each comprises a hidden Markov model.

17. The apparatus of claim 13 wherein said first speaker dependent speech model comprises a first hidden Markov model, and said second speaker dependent speech model comprises a second hidden Markov model, and wherein said second hidden Markov model contains fewer states than said first hidden Markov model.

18. The method of claim 13, wherein said second ordering of said set of states comprises a reversal of said first ordering of said set of states.

19. The apparatus of claim 13 wherein said first speaker dependent speech model comprises a first hidden Markov model, and said second speaker dependent speech model comprises a second hidden Markov model, and wherein said second hidden Markov model contains fewer acoustic parameters than said first hidden Markov model.

20. The apparatus of claim 19 wherein each of said first speaker dependent speech model and said second speaker dependent speech model comprises a single state hidden Markov model.

21. The apparatus of claim 13 wherein said previously provided training speech comprises a plurality of repetitions of a phrase comprising one or more words, and wherein said speech utterance spoken by the speaker also comprises said phrase comprising said one or more words.

22. The apparatus of claim 13 wherein said speech utterance spoken by the speaker comprises a phrase comprising one or more words, and wherein said previously provided training speech does not include said phrase comprising said one or more words.

23. The apparatus of claim 13 wherein said means for verifying said proffered identity of the speaker comprises means for comparing said value reflecting a differential between said first score and said second score to a predetermined threshold.

24. The apparatus of claim 23 wherein said predetermined threshold equals one.

* * * * *